(12) United States Patent
Yu et al.

(10) Patent No.: US 6,522,522 B2
(45) Date of Patent: *Feb. 18, 2003

(54) CAPACITORS AND SUPERCAPACITORS CONTAINING MODIFIED CARBON PRODUCTS

(75) Inventors: Yuan Yu, North Billerica, MA (US); Curtis E. Adams, Watertown, MA (US)

(73) Assignee: Cabot Corporation, Boston, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/495,798

(22) Filed: Feb. 1, 2000

(65) Prior Publication Data

US 2002/0171996 A1 Nov. 21, 2002

(51) Int. Cl.[7] .................................................. H01G 9/00
(52) U.S. Cl. ...................................... 361/502; 361/503
(58) Field of Search ................................ 361/500–510, 361/516, 524, 528, 529, 530, 532; 423/445 R; 502/159, 182

(56) References Cited

U.S. PATENT DOCUMENTS

| | | | |
|---|---|---|---|
| 3,536,936 A | 10/1970 | Rubinstein et al. | 307/269 |
| 5,115,378 A | 5/1992 | Tsuchiya et al. | 361/502 |
| 5,168,433 A | 12/1992 | Mukouyama et al. | |
| 5,260,855 A | 11/1993 | Kaschmitter et al. | 361/502 |
| 5,554,739 A | 9/1996 | Belmont | 534/885 |
| 5,581,438 A | 12/1996 | Halliop et al. | 361/502 |
| 5,585,999 A | 12/1996 | De Long et al. | 361/505 |
| 5,749,950 A | 5/1998 | Mahmud et al. | 106/316 |
| 5,796,574 A * | 8/1998 | Saito et al. | 361/502 |
| 5,811,205 A | 9/1998 | Xavier et al. | 429/137 |
| 5,872,177 A | 2/1999 | Whitehouse | 524/495 |
| 5,885,335 A | 3/1999 | Adams et al. | 106/316 |
| 5,895,522 A | 4/1999 | Belmont et al. | 106/31.6 |
| 5,900,029 A | 5/1999 | Belmont et al. | 8/550 |
| 5,986,876 A | 11/1999 | Stepanov et al. | 361/502 |
| 6,031,711 A | 2/2000 | Tennent et al. | 361/303 |
| 6,205,016 B1 * | 3/2001 | Niu | 361/503 |
| 6,228,942 B1 * | 5/2001 | Michot et al. | 525/183 |

FOREIGN PATENT DOCUMENTS

WO    WO 97/43774    11/1997

* cited by examiner

*Primary Examiner*—Dean A. Reichard
*Assistant Examiner*—Eric Thomas

(57) ABSTRACT

Capacitors, including supercapacitors, are described wherein the electrode contains at least one modified carbon product, wherein the modified carbon product is at least one carbon product having attached at least one organic group. The use of the modified carbon product in the electrodes for capacitors preferably leads to improved capacitance and/or lower internal resistance of the capacitor. Further, the use of modified carbon products in the electrodes for capacitors permits easier manufacturing steps for the production of capacitors.

17 Claims, 1 Drawing Sheet

F I G. 1
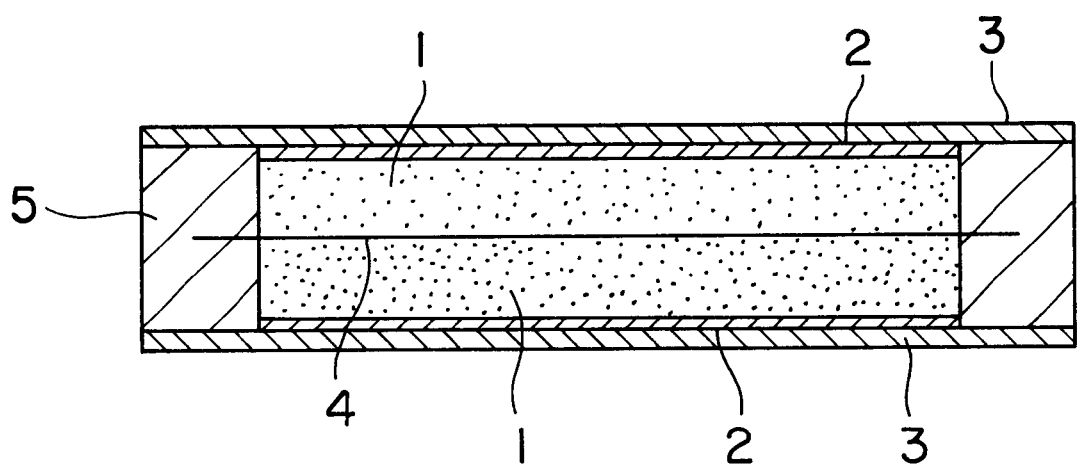

CAPACITORS AND SUPERCAPACITORS CONTAINING MODIFIED CARBON PRODUCTS

BACKGROUND OF THE INVENTION

The present invention relates to capacitors and supercapacitors. More particularly, the present invention relates to capacitors and supercapacitors having at least one component containing a carbon product. The present invention further relates to methods of making capacitors and supercapacitors.

A capacitor is typically a device for introducing capacitance into a circuit. In general, a capacitor consists of two metal plates insulated from each other by a dielectric. The capacitance of a capacitor can depend primarily on the shape and size of the capacitor and upon the relative dielectric constant of the medium between the plates.

There are a variety of different types of capacitors. For instance, there are electric double layer capacitors which contain a gasket, a pair of polarized electrodes made of activated carbon particles and disposed in the gasket, a separator disposed between the polarized electrodes for preventing electrons from moving between the electrodes, and a pair of current collectors mounted respectively on the opposite surfaces of the polarized electrodes. The electrodes can be made as paste electrodes from a concentrated slurry of a powdery or particulate activated carbon and an electrolyte. These double layer capacitors are sometimes referred to as supercapacitors or ultracapacitors.

There is always a demand for improved capacitors which have a higher ability to store energy, in other words, a higher capacitance. There is also a need to lower the internal resistance within the capacitor. There is yet another need to lower the internal current leakage. Also, manufactures are always interested in processes which can reduce production costs such as by simplifying the overall manufacturing of capacitors.

SUMMARY OF THE INVENTION

A feature of the present invention is to provide an electrode which preferably has the ability to promote a higher capacitance once incorporated into a capacitor.

Another feature of the present invention is to provide an electrode that promotes lower internal resistance once incorporated into a capacitor.

An additional feature of the present invention is to provide electrodes which are easier to manufacture.

A further feature of the present invention is to provide electrodes with a lower DC leakage.

Additional features and advantages of the present invention will be set forth in part in the description which follows, and in part will be apparent from the description, or may be learned by practice of the present invention. The objectives and other advantages of the present invention will be realized and obtained by the elements and description particularly pointed out in the written description and appended claims.

To achieve these and other advantages and in accordance with the purpose of the present invention, as embodied and broadly described herein, the present invention relates to an electrode. The electrode contains at least one modified carbon product and at least one binder. The modified carbon product is at least one carbon product having attached at least one organic group.

The present invention further relates to a capacitor which contains at least one electrode of the present invention.

The present invention further relates to a method to increase the capacitance of a capacitor by using at least one electrode containing at least one modified carbon product.

The present invention further relates to a method to lower internal resistance of a capacitor by using at least one electrode containing at least one modified carbon product.

It is to be understood that both the foregoing general description and the following detailed description are exemplary and explanatory only and are intended to provide further explanation of the present invention, as claimed.

BRIEF DESCRIPTION OF THE DRAWINGS

FIG. 1 is a schematic drawing of a capacitor structure of the present invention.

DETAILED DESCRIPTION OF THE PRESENT INVENTION

The present invention relates to capacitors having electrodes. For purposes of the present invention, the capacitor includes, but is not limited to, capacitors and supercapacitors. The capacitors of the present invention have at least one electrode which contains at least one modified carbon product. Preferably, a capacitor, which typically has at least two electrodes has both electrodes containing at least one modified carbon product. Besides the modified carbon product, at least one binder will typically be present and mixed with the at least one modified carbon product to form the electrode.

The electrodes of the present invention can be formed from more than one type of modified carbon product and/or additionally contained conventional carbon products such as activated carbon.

In forming the electrode, typically, the modified carbon product will be combined with at least one binder to form a paste which can then be used to form the electrode. Alternatively, the paste can be put on a conductive substrate or current collector to form the electrode.

Any carbon products that are used in electrodes, such as electrodes used for capacitors, can be used in the present invention. Examples of such carbon products include, but are not limited to, graphite, carbon black, vitreous carbon, activated charcoal, carbon fiber, activated carbon, and carbon aerogels. Catalyzed carbon products can also be used in the present invention, wherein surface modification can be preformed either before or after the catalyzing step. Finely divided forms of the above are preferred. Further, mixtures of different carbon products can be used. Preferably, the carbon product used is capable of reacting with a diazonium salt to form the above-mentioned carbon products. The carbon may be of the crystalline or amorphous type. In addition, mixtures of different types of modified carbon products can also be used in the present invention as one embodiment.

The organic groups as well as methods to attach the carbon product to form a modified carbon product are described in the following U.S. patents and publications which are all incorporated in their entirety by reference herein: 5,851,280; 5,837,045; 5,803,959; 5,672,198; 5,571,311; 5,630,868; 5,707,432; 5,554,739; 5,689,016; 5,713,988; WO 96/18688; WO 97/47697; and WO 97/47699.

Preferably, the organic groups which are attached onto the carbon product are electron donor and/or electron acceptor groups. Alternatively, the organic groups, which are, attached onto the carbon products include electron donor and/or electron acceptor groups. Yet another possibility is that electron donor and/or electron acceptor groups can be associated with the carbon product surface as counter ions. The organic groups that are attached onto carbon product could be simple small molecules, oligomers, or polymers. Examples of such electron donor and acceptor groups include, but are not limited to, substituted or un-substituted quinones; organometallic groups, such as substituted or un-substituted metallocenes (e.g., ferrocenes); substituted or un-substituted thiophenes/furans/pyrroles/carbazoles; substituted or un-substituted tetrathiafulvalene; and/or substituted or unsubstituted aromatic amines, for example, triphenylamines. Examples of polymeric electron donor and acceptor groups include, but not limited to, polythiophenes, polyacetylenes, polyphenylenevinylenes, polyanilines, and poly vinylcarbazoles.

The organic groups which are attached onto the carbon product can preferably be at least one or more ionic or ionizable groups or both. Ionic or ionizable functional groups forming anions or anionic groups include, for example, acidic groups or salts of acidic groups. Examples of organic groups that are anionic in nature include, but are not limited to, $—C_6H_4—COO^-X^+$; $—C_6H_4—SO_3^-X^+$; $—C_6H_4\text{-}(PO_3)^{-2}2X^+$; $—C_6H_2\text{-}(COO^-X^+)_3$; $—C_6H_3\text{-}(COO^-X^+)_2$; $—(CH_2)_z\text{-}(COO^-X^+)$; $—C_6H_4\text{-}(CH_2)_2\text{-}(COO^-X^+)$, wherein $X^+$ is any cation such as $Na^+$, $H^+$, $K^+$, $NH_4^+$, $Li^+$, $Ca^{2+}$, $Mg^{2+}$ and the like and z is an integer of from 1 to 18. As recognized by those skilled in the art, $X^+$ may be formed in-situ as part of the manufacturing process or may be associated with the aromatic or alkyl group through a typical salt swap or ion-exchange process. Amine represent examples of ionizable functional groups that form cations or cationic groups. Quaternary ammonium groups, quaternary phosphonium groups and sulfonium groups also represent examples of cationic group. Examples of organic groups that are cationic in nature include, but are not limited to, $—C_6H_4N(CH_3)_3^+Y^-$, $—C_6H_4COCH_2N(CH_3)_3^+Y^-$, $—C_6H_4(NC_5H_5)^+Y^-$, $—(C_5H_4N)C_2H_5^+Y^-$, $—(C_3H_5N_2)^+Y^-$ (imidazoles), $—(C_7H_7N_2)^+Y^-$ (indazoles), $—C_6H_4COCH_2(NC_5H_5)^+Y^-$, $—(C_5H_4N)CH_3^+Y^-$, and $—C_6H_4CH_2N(CH_3)_3^+Y^-$, wherein $Y^-$ is any halide or an anion such as $RSO_3^-$, $SO_4^{2-}$, $PO_4^{3-}$, $NO_3^-$, $OH_3^-$, $CH_3COO^-$ and the like; or combinations thereof, wherein R is an alkyl or aromatic group. As recognized by those skilled in the art, $Y^-$ may be formed in-situ as part of the manufacturing process or may be associated with the aromatic or alkyl group through a typical salt swap or ion-exchange process.

Preferably, organic electrolytes, for example, propylene carbonate with salts, are used with electrodes containing ionic or ionizable group modified carbon products. Carbon products for both electrodes in a cell could be the same, e.g., both anionic or cationic in nature, or different, e.g., one electrode is anionic or cationic in nature, or different, e.g., one electrode is anionic while the other one is cationic.

As part of the present invention, the treatment level of organic groups with the carbon products to form the modified carbon products can be used. For example, as a preferred embodiment of the present invention, the treatment level (which is expressed in terms of $\mu mol/m^2$ of carbon) of the organic group on the carbon product is from about 0.1 to about 10 $\mu mol/m^2$ or more. The modified carbon products used in the electrodes of the present invention can have one type of organic group attached or more than one type of organic group attached to the carbon product. In other words, dual or multi-treated modified carbon products can be used. Also, a mixture of modified carbon products having different organic groups attached can be used as well.

A current collector can optionally be used in the present invention and can be conventional. For instance, the current collector can be formed from a carbon sheet, non-porous metal, or conductive polymers. Preferably the current collector is a metal foil such as aluminum foil. The electrolyte can be inorganic or organic. Examples of electrolytes include, but are not limited to water, ammonia, sulfur dioxide, phosphoryl chloride, thionyl chloride, sulfuryl chloride, or mixtures thereof. Other examples include propylene carbonate, ethylene carbonate, methylformate, dimethylsulfoxide, ethylene glycol sulfate, acetonitrile, tetrahydrofuran, 1,2-dimethoxyethane, and mixtures thereof. The electrode(s) is generally impregnated with an electrolyte to form the polarized electrode. A conventional separator can also be used to separate two electrodes from each other. Examples of separators include, but are not limited to, porous paper, porous polyethylene films, porous fabrics, and the like. In order to achieve higher output voltage, bi-polar plates are normally used to stack each cell. Examples of bi-polar plates include, but are not limited to, metal, conductive rubber, plastic, non-porous carbon, or metal-plastic composites. The capacitors described in U.S. Pat. Nos. 5,115,378; 5,581,438; 5,811,204, 5,585,999, and 5,260,855 are incorporated in their entirety herein by reference. These patents generally describe conventional components which can be used in the present invention with respect to electrolytes, containers to contain the capacitor, current collectors, and general structures of the electrodes and overall capacitor designs. FIG. 1 is a generalized cross-sectional view of an electric double layer capacitor that may be produced according to the present invention.

The electric double layer capacitor comprises a pair of polarized electrodes 1 with surfaces confronting each other. The capacitor also includes a pair of electrically conductive layers 2 which are formed respectively on the other surfaces of the electrode bodies of the polarized electrodes 1. The polarized electrodes 1 may be housed in an annular gasket 5 which is made of electrically nonconductive rubber or synthetic resin. The polarized electrodes 1 are separated from one another by a separator 4 disposed therebetween. The capacitor further includes a pair of current collectors 3 disposed respectively on the outer surfaces of the electrically conductive layers 2 on the polarized electrodes 1.

Besides the presence of a modified carbon product in the at least one electrode described above, conventional ingredients used in electrodes can also be present in the electrodes of the present invention. For instance, binders, conductive fillers, and other surface active additives can be optionally used.

With the use of modified carbon products in forming the electrodes, the manufacturing steps of forming the electrode and the overall capacitor can be simplified. In particular, when the modified carbon product is mixed with at least one binder and at least one carrier (e.g., water) to form a mixture, the modified carbon product can be distributed uniformly throughout the mixture and then when the mixture is poured, casted, or coated onto a current collection, if one is used, the use of the modified carbon product permits a uniform distribution of the mixture across the surface area of the current collector. For purposes of such a uniform distribution, preferably the organic group which is attached onto the carbon product preferably covalently or ionically, can be tailored to be more compatible with carriers (either aqueous or non-aqueous) and binders.

With the use of the modified carbon products in electrodes, the capacitors of a capacitance can be improved. For instance, specific groups can be introduced to enhance pseudo-capacitance, e.g., quinone groups, and enhance the surface properties of the carbon material to promote the formation of electrical double layer, e.g., surface charged groups, for example, carboxylate groups.

Similarly, the use of the modified carbon product of the present invention in electrodes can permit a decrease of the internal resistance in a capacitor. For instance, specific groups can be introduced to the carbon material surface to reduce the resistance between particle to particles; examples are redox groups and conductive polymers.

The present invention will be further clarified by the following examples, which are intended to be exemplary of the present invention.

EXAMPLES

Example 1

Preparation of a Surface Functionalized Carbon Black Product with a Diazonium Salt This example illustrates the preparation of a surface modified carbon black product of the present invention. A fluffy carbon black (from Cabot Corporation, Billerica, Mass.) with a BET nitrogen surface area of 500 $m^2/g$ and a DBPA of 100 cc/100 g was used. Fifty grams of the fluffy carbon black were added to a solution of 24.5 g of 2-amino-anthraquinone (available from Aldrich Chemical, Milwaukee, Wis.) dissolved in 725 g of de-iniozed water and 10.9 g of 37% HCl (available from Aldrich Chemical, Milwaukee, Wis.) at 70° C. Then 225 mL of iso-propanol (available from Aldrich Chemical, Milwaukee, Wis.) was added to assist the wetting of carbon black. To the reaction solution, 7.38 g of sodium nitrite (available from Aldrich Chemical, Milwaukee, Wis.) dissolved in 30 g of de-ionized water was added drop by drop over a period of 5 minutes and stirred rapidly, to produce a diazonium salt, which reacted with the carbon black. The resulting reaction mixture was stirred rapidly for two more hours before cooled back to room temperature. Surface modified carbon black product was then filtered out by vacuum filtration. The crude modified carbon black was dried at 70° C. overnight. The carbon black product was then Soxhlet extracted with methanol overnight and followed by toluene overnight.

Example 2

Incorporation of a Polymeric Binder

Twenty-five grams of carbon black material prepared in Example 1 were made into fluffy form by chopping the carbon black in an industrial blender for 3 minutes. The carbon black was then added to a beaker with 1000 g of de-ionized water and 40 mL of iso-propanol at 80° C. The carbon black suspension was stirred rapidly for 90 minutes before 6.25 g of DuPont Teflon type 30 dispersion (5.9% of wetting agent, 60.3% of fluoropolymer, available from DuPont, Washington, W. Va.) were added. An additional 300 g of de-ionized water was added and the mixture was stirred for additional 2 hours at 80° C. After cooling the mixture to room temperature the fluoropolymer bonded carbon black product was isolated by vacuum filtration. The carbon material was then dried at 150° C. overnight under vacuum.

Example 3

Preparation of Carbon Electrode for Electro-Chemical Evaluation

Carbon disk preparation: about 0.15 grams of the dried material from Example 2 were pressed in a Carver Lab Press Model B (available from Fred Carver Inc, Summit, N.J.) with a 13 mm diameter die at 60 kpsi pressure for 10 minutes.

Wetting of carbon disks with electrolyte: The carbon dicks were placed on a medium porosity glass filter inside a glass chamber. The chamber was evacuated using a water pump to a modest vacuum. The chamber was then filled with water heated to roughly 70° C. The vacuum drained the water through the glass filter. The electrode was then removed from the chamber and placed into a solution of 30% KOH. Electrodes typically remained in the KOH solution for at least 24 hours before testing. The dry and wet weights of the electrode were recorded.

Capacitor Construction: The carbon disks were tested by constructing a single cell capacitor in a cylindrical Teflon holder. Thin wires were welded to 2 conducting metal disks. The wires were drawn through holes drilled on the top and bottom of the Teflon cylinder. These wires served to conduct the charge in and out of the capacitor. The capacitor was constructed by first placing one metal disk on the bottom of the cylinder. One carbon disk would then be placed on top of the metal disk. A thin paper separator material was placed over the electrode. A few drops of 30% KOH ensured that the paper was saturated. The second carbon disk was then placed over the separator material, and finally the other metal disk was placed over the second carbon disk. The Teflon holder consisted of 2 pieces which could be screwed together to supply pressure on the capacitor thus ensuring good electron contact between the metal current collectors and the carbon disk electrodes.

Example 4

General Descriptions of Electro-Chemical Testing

Constant current test: Before testing, all capacitors were charged and discharged 3 or 4 times using the constant current test described below. The constant current test was conducted using an Arbin Instruments model BT 2043 tester and the Arbin MITS 97 software control program. The test consisted of 7 steps.

Step 1: 5-second test

Step 2: Constant current charge for 1 second with a data acquisition rate of either 10 Hz or 4 Hz.

Step 3: Constant current charge to 1 V with a data acquisition rate of 1 Hz.

Step 4: Constant voltage charge at 1 V for 60 seconds (The current would taper toward 0 during this step)

Step 5: Constant current discharge for 1 second with a data acquisition rate of either 10 Hz or 4 Hz.

Step 6: Constant current discharge to 0 V with a data acquisition rate of 1 Hz.

Step 7: 5 second test.

The constant current tests were either preformed with 1 charge-discharge cycle or 2 cycles. If 2 cycles were used, the program completed step 6 then jumped to step 2 to repeat charge-discharge. The tests were typically started with the capacitor charged to 10–20 mV from previous tests.

Self discharged test: The self discharge test was conducted using a Arbin Instruments model BT2043 tester and the Arbin MITS 97 software control program. The test consisted of 5 steps.

Step 1: 5 second test

Step 2: Constant current charge at 100 mA to 1 V.

Step 3: Constant voltage charge at 1 V for 60 second.

Step 4: Open circuit with a data acquisition rate of 0.5 Hz for 5 minutes.

Step 5: Open circuit with a data acquisition rate of once every 3 minutes for 24 hours.

Cycle-life test: The cycle life test was conducted using a Arbin Instruments model BT2043 tester and the Arbin MITS 97 software control program. The test consisted of running the standard constant current test at 200 mA once. Then running the test (taking data once at the end of each charge, discharge, and hold period) with the number of cycles set to 1000 and current at 200 mA, and finally running the standard constant current test again at 200 mA.

Example 5

Performance of Surface Modified Carbon-Containing Electrodes

This example summarized the performance of surface modified carbon black for supercapacitor application. For comparison purposes, an un-modified carbon black (starting carbon black in Example 1) was tested as well.

TABLE 1

Comparison of electro performance of surface modified carbon vs un-modified carbon (electro-chemical data for charging and discharging at 200 mA, all carbon electrodes were 13 mm in diameter)

| Properties | Control (un-modified carbon) | Modified carbon in Example 1 | Modified carbon in Example 1 after 1000 cycles of test |
|---|---|---|---|
| Dry Weight (grams)[a] | 0.1435 | 0.1715 | — |
| Thickness (cm)[9] | 0.128 | 0.127 | — |
| Density (g/cc)[a] | 0.844 | 1.01 | — |
| C(F) per cell | 3.5 | 5.5 | 5.7 |
| F/cc per electrode) | 42 | 65 | 67 |
| F/gm (per electrode) | 50 | 64 | 66 |
| Ohm (Resistance) | 0.67 | 0.42 | 0.45 |
| Ohm-cm | 7 | 3.3 | 3.4 |

[a] - average of 2 electrodes;

As shown by this example, surface quinone modified carbon black gave higher capacitance and lower resistance. Also, after 1000 cycles of test, the surface modified carbon maintained its performance, which indicated good stability. Also the internal leakage was less than 35% after 24 hrs. The reduction of resistance was especially impressive, which implied that surface modification with electron donor or acceptor groups facilitates the electron transfer between conductive particles, thus enhancing the conductivity.

Other embodiments of the present invention will be apparent to those skilled in the art from consideration of the present application and practice of the present invention disclosed herein. It is intended that the specification and examples be considered as exemplary only, with a true scope and spirit of the present invention being indicated by the following claims and equivalents thereof.

What is claimed is:

1. An electrode comprising at least one modified carbon product and at least one binder, wherein said modified carbon product comprises at least one carbon product having attached at least one organic group, wherein said organic group comprises at least one aromatic group or $C_1$–$C_{12}$ alkyl group, and wherein said at least one aromatic group or $C_1$–$C_{12}$ alkyl group is directly attached to said at least one carbon product.

2. A capacitor comprising at least one electrode of claim 1.

3. A supercapacitor comprising at least one electrode of claim 1.

4. The electrode of claim 1, wherein said electrode is a supercapacitor electrode.

5. The electrode of claim 1, wherein said organic group comprises at least one electron donor or electron acceptor group.

6. The electrode of claim 1, wherein said organic group comprises at least one quinone or substituted quinone group.

7. The electrode of claim 1, wherein said organic group comprises at least one ionic or ionizable group.

8. The electrode of claim 1, wherein said at least one carbon product is graphite, carbon black, vitreous carbon, activated charcoal, activated carbon, carbon aerogel, or mixtures thereof.

9. The electrode of claim 1, wherein said at least one carbon product is carbon black.

10. The electrode of claim 1, wherein said at least one carbon product is carbon aerogel.

11. The electrode of claim 1, wherein said at least one organic group is a substituted or un-substituted metallocenes, substituted or un-substituted thiophenes/furans/pyrroles/carbazoles; substituted or un-substituted tetrathiafulvalene; or substituted or un-substituted aromatic amine.

12. The electrode of claim 1, wherein said at least one organic group is polythiophenes, polyacetylenes, polyphenylenevinylenes, polyanilines, and polyvinylcarbazoles.

13. A capacitor comprising a pair of electrodes, each comprising at least one modified carbon product and at least one binder;

a separator interposed between the electrodes;

a gasket housing said electrode bodies and said separator therein;

wherein said modified carbon product comprises at least one carbon product having attached at least one organic group, and wherein said at least one modified carbon product is the same or different for each electrode, wherein said at least one organic group comprises at least one aromatic group or $C_1$–$C_{12}$ alkyl group, and wherein said at least one aromatic group or $C_1$–$C_{12}$ alkyl group is directly attached to said at least one carbon product.

14. The capacitor of claim 13, further comprising electrolyte in said gasket housing.

15. The capacitor of claim 13, further comprising a pair of current collectors disposed on the surfaces of each electrode.

16. A method for improving the capacitance of a capacitor comprising incorporating at least one modified carbon product into an electrode, wherein said organic group comprises at least one aromatic group or $C_1$–$C_{12}$ alkyl group, and wherein said at least one aromatic group or $C_1$–$C_{12}$ alkyl group is directly attached to said at least one carbon product.

17. A method for decreasing internal resistance of a capacitor comprising introducing at least one modified carbon product into at least one electrode, wherein said organic group comprises at least one aromatic group or $C_1$–$C_{12}$ alkyl group, and wherein said at least one aromatic group or $C_1$–$C_{12}$ alkyl group is directly attached to said at least one carbon product.

* * * * *